United States Patent
Kronrod et al.

(10) Patent No.: US 10,956,366 B2
(45) Date of Patent: Mar. 23, 2021

(54) DYNAMIC PHYSICAL CAPACITY ALLOCATION IN AN UNBALANCED CAS SYSTEM

(71) Applicant: EMC IP Holding Company LLC, Hopkinton, MA (US)

(72) Inventors: Svetlana Kronrod, Concord, MA (US); Zvi Schneider, Tel Aviv (IL); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 3 days.

(21) Appl. No.: 16/050,836

(22) Filed: Jul. 31, 2018

(65) Prior Publication Data

US 2020/0042612 A1    Feb. 6, 2020

(51) Int. Cl.
*G06F 3/06* (2006.01)
*G06F 16/13* (2019.01)
*G06F 16/27* (2019.01)

(52) U.S. Cl.
CPC .......... *G06F 16/137* (2019.01); *G06F 3/065* (2013.01); *G06F 3/067* (2013.01); *G06F 3/0608* (2013.01); *G06F 3/0641* (2013.01); *G06F 16/27* (2019.01)

(58) Field of Classification Search
CPC ........ G06F 3/067; G06F 3/065; G06F 3/0641; G06F 3/0608; G06F 16/137; G06F 16/127
See application file for complete search history.

(56) References Cited

U.S. PATENT DOCUMENTS

| | | | |
|---|---|---|---|
| 8,849,825 B1 * | 9/2014 | McHugh | G06F 16/1873 707/737 |
| 8,996,535 B1 * | 3/2015 | Kimmel | G06F 3/0608 707/747 |
| 9,208,162 B1 | 12/2015 | Hallak et al. | |
| 9,378,106 B1 | 6/2016 | Ben-Moshe et al. | |
| 9,396,243 B1 | 7/2016 | Halevi et al. | |
| 2012/0124282 A1 * | 5/2012 | Frank | G06F 3/061 711/108 |
| 2017/0177611 A1 * | 6/2017 | Gowdappa | G06F 16/182 |
| 2019/0042571 A1 * | 2/2019 | Li | G06F 16/2379 |

\* cited by examiner

*Primary Examiner* — Jane Wei
(74) *Attorney, Agent, or Firm* — Daly, Crowley Mofford & Durkee, LLP

(57) ABSTRACT

An aspect of dynamic physical capacity allocation in an unbalanced content-addressable storage system includes initiating a scale up for a storage cluster. An aspect further includes determining a target number of hash-to-physical-location-on-disk (h2d) slices to be assigned to each data module (D module), and reassigning h2d slices assigned to D modules having greater than the target number of h2d slices to D modules having less h2d slices than the target number.

15 Claims, 8 Drawing Sheets

DYNAMIC PHYSICAL CAPACITY ALLOCATION IN AN UNBALANCED CAS SYSTEM

BACKGROUND

Computer data is vital to today's organizations, and content addressable storage systems (such as DELL EMC XTREMIO) (hereinafter "XtremIO") can support a rich set of advanced data services such as single data instance, compression, snapshots, etc., by decoupling storage access, logical volume address space, and physical on-disk location of data. In systems such as this, volume and physical layout metadata can offer tremendous flexibility in decoupling and virtualization. Logical volume metadata used with these systems can provide flexible mapping from logical address to data content references, also known as a hash handle. The logical volume metadata also can make snapshot and dingle instance storage operations highly efficient.

As a content addressable storage (CAS) system, XtremIO decides on physical data placement based on data signatures. The space of possible data signatures is equally divided between all data modules (D modules). This creates a challenge for unbalanced configurations, where D modules are expected to be responsible for unequal parts of physical capacity. If the data signatures' space was equally divided between D modules, the cluster would reach a physical space condition upon reaching out of space on D module with smallest amount of capacity available thereby preventing use of the larger physical capacity available on other D modules.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for dynamic physical capacity allocation in an unbalanced content addressable storage system. The method includes initiating a scale up for a storage cluster. The method further includes determining a target number of hash-to-physical-location-on-disk (h2d) slices to be assigned to each data module (D module), and reassigning h2d slices assigned to D modules having greater than the target number of h2d slices to D modules having less h2d slices than the target number.

Another aspect may provide a system for dynamic physical capacity allocation in an unbalanced content addressable storage system. The system includes a memory having computer-executable instructions and a processor. The processor executes the computer-executable instructions. When executed by the processor, the computer-executable instructions cause the processor to perform operations. The operations include initiating a scale up for a storage cluster. The operations further include determining a target number of hash-to-physical-location-on-disk (h2d) slices to be assigned to each data module (D module), and reassigning h2d slices assigned to D modules having greater than the target number of h2d slices to D modules having less h2d slices than the target number.

Another aspect may provide a computer program product embodied on a non-transitory computer readable medium. The computer program product includes instructions that, when executed by a computer, causes the computer to perform operations. The operations include initiating a scale up for a storage cluster. The operations further include determining a target number of hash-to-physical-location-on-disk (h2d) slices to be assigned to each data module (D module), and reassigning h2d slices assigned to D modules having greater than the target number of h2d slices to D modules having less h2d slices than the target number.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1A:
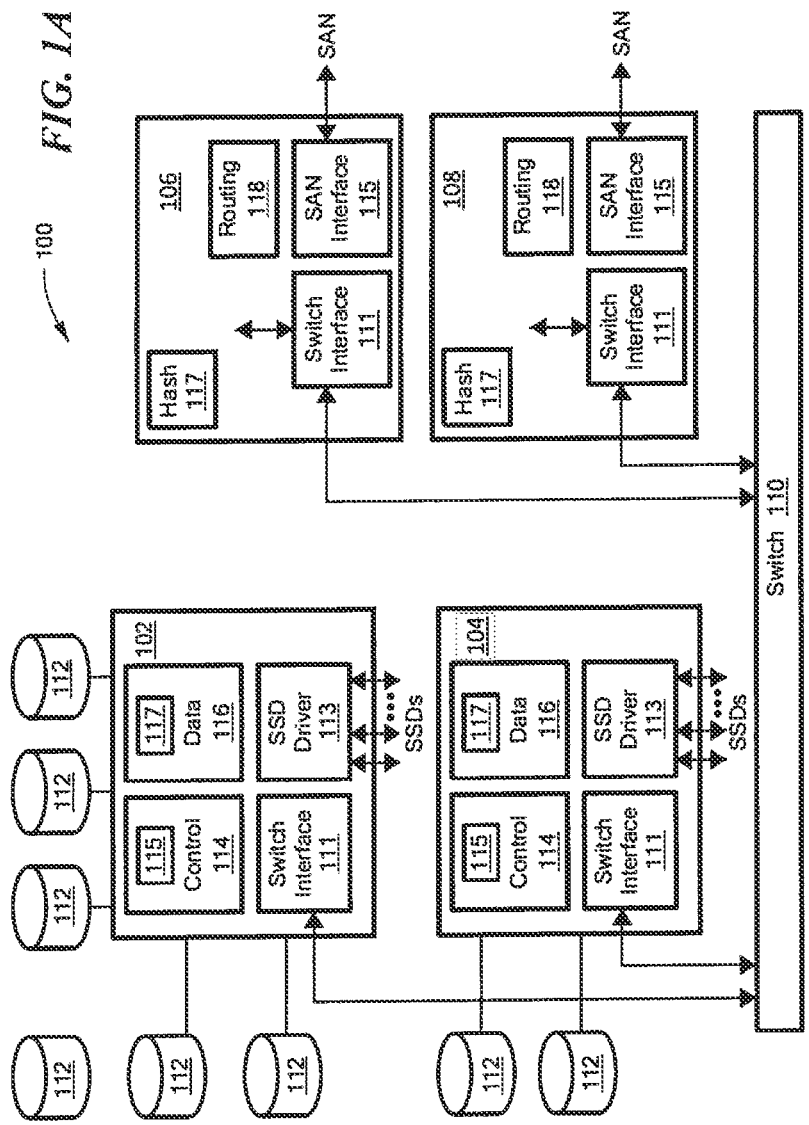
FIG. 1A is a block diagram of a content-based storage system having multi-level cache for deduplicated storage.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, the term "I/O request" or simply "I/O" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a snapshot may refer to differential representations of an image, i.e. the snapshot may have pointers to the original volume, and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a time stamp of the I/O.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, a "checkpoint" refers at least to an entity created by a checkpoint process, where the checkpoint process performs actions to preserve the state of an apparatus, system, or other entity (including software entities) at a particular time. Advantageously, a checkpoint includes information such as user data, the configuration of the apparatus, user metadata, and other information related to the internal state of the apparatus or system. For example, some storage systems (including XtremIO), in accordance with certain embodiments herein, also provide some kind of checkpoint feature, to provide an ability to preserve system state including user data and metadata at some defined point in time in order to restore this state after system malfunction or corruption. In certain embodiments, the checkpoint corresponds to a frozen, immutable re representation of the state of a system or apparatus at certain point in time, including user data, metadata, and the system configuration. In certain embodiments, the checkpoint is stored in a dedicated, reserved location within the system. In certain embodiments, the checkpoint is able to be created in an online, dynamic environment, where the checkpoint creation is transparent to entities having I/O interactions with the system.

For a file system, the accuracy and consistency of a file system is necessary to relate applications and data, so a checkpoint provides a way to provide periodic backup of file server state to allow system recovery in the event of faults or failures. When data corruption is detected, one of the checkpoints can be used for file system recovery. Similarly, a checkpoint, in a virtualization context, is a snapshot of the state of a virtual machine. Like a restore point in MICROSOFT WINDOWS operating systems, a checkpoint allows an administrator to restore an entity (e.g., a computer system, a file system, an application, a virtual machine, etc.) to a previous state. Checkpoints also can be used to create backups before conducting updates. Should an update fail or cause problems, an administrator can return the virtual machine to its state prior to the update. A recover action is used to return the system to the checkpoint state.

In some embodiments, logical block addressing" (LBA) refers to a linear addressing technique for specifying locations of blocks of data stored in storage system.

In certain embodiments, a RAID_stripe is a group of pages that are RAID self-consistent (data in a RAID_stripe can be recovered upon drive failure, independently of data residing on other RAID_stripes), and that RAID operation is performed atomically on this space. A RAID_stripe has stripe metadata (MD) associated with it describing its type (usually the block size it supports).

In some embodiments, a demoted LBA/hash refers to a LBA or hash that is not in memory (e.g., RAM), and thus requires SSD read operations to load the metadata).

In some embodiments, non-volatile memory over fabrics (NVMEoF) refers to a specification to enable non-volatile memory message-based commands to transfer data between hosts and targets (solid-state storage) or other systems and networks, such as Ethernet, Fibre Channel (FC) or Infiniband.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data. In an exemplary Content Addressable Storage (CAS) array (e.g., as described in U.S. Pat. No. 9,208,162 (hereinafter "'162 patent"), which is hereby incorporated by reference), data is stored in blocks, for example of 4 KB, where each block has a unique large hash signature, for example of 20 bytes, saved on Flash memory. In certain embodiments, a long hash is a value computed based on a data packet, such as a SHA-1 hash that is 20 bytes in length, but this is not limiting. As described herein, hash signatures (also referred to herein as full hashes or long hashes) are accessed by small in-memory handles (Called herein, interchangeably, hash handles, short hash handles or short hashes)), for example of 6 bytes. These handles are unique to each array, but not necessarily unique across arrays. A hash signature is unique, meaning that if two hash signatures are the same then their corresponding data blocks are the same. In certain embodiments, a hash signature may be represented by a short hash generated by using, for example, processes shown in FIG. 12A of the '162 patent. Short hashes are not necessarily world-wide unique, but in certain embodiments short hashes can be unique within a domain. In certain embodiments, the long hash can be computed or determined based on the short hash, using, for example, processes shown in FIG. 12C of the '162 patent.

When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it can be faster to send the data without a hash signature, and let the target calculate the hash signature.) While the hash handles are readily available without the need to read from Flash, since the hash handles are not unique, they cannot be easily used to check if a target contains a hash signature. In some implementations, hash handles are shortcuts for hash signatures, and can give a reliable hint of the existence of a hash signature in an array.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

FIG. 1A shows an illustrative content-based data storage system 100 with deduplication that may have multi-level data caches in accordance with embodiments of the disclosure. In the illustrated embodiment, first, second, third, and fourth nodes 102, 104, 106, 108 can be interconnected by a switch 110 via a switch interface 111. The first node 102 can include a control system 114 and a data system 116. In embodiments, separate data and control planes may be provided by the control and data systems 114, 116. The control system 114 may control execution of read and write commands to the storage devices 112. The data systems 116 may be connected to the storage devices 112 and, under control of a respective control system 114, may pass data to and/or from the storage devices via suitable storage drivers 113.

The data and/or control systems 114, 116 may retain extracts of the data stored in the storage devices 112. In embodiments, the data extracts may be generated by cryptographic hashing of the data content in the data blocks. In embodiments, the extracts may be used for content addressing of the data blocks to the physical storage devices 112.

The second node 104 can include a hash system 117 to generate the hash/extract, which can be referred to as a content fingerprint for the data blocks. The second node 104 can also include a routing system 118, along with a switch interface 111 and a SAN interface 115. The routing system 118 may terminate storage and retrieval operations and distribute commands to control systems 114 that may be selected for the operation in such a way as to retain balanced usage within the system. In the illustrated embodiment, the third node 106 can be similar to the first node 102 and the fourth node 108 can be similar to the second node 108.

The routing systems 118 may use the hash values calculated from data blocks to select control systems 114 for distribution. More particularly, selection of the control system 114 may use hash values, or may rely on the user address and not on the content (hash). The hash value may, however, be used for selecting the data system 116, and for setting the physical location for data storage within the data system.

In example embodiments, control modules 114 (also referred to as "C-Modules") can include a C cache 115 and the data modules 116 (also referred to as "D-Modules") can include a D cache 117. As explained more fully below, the C cache 115 can include addresses and address hashes, and the D cache 117 can include, for each bucket, physical data location information, a filter, a hash to physical location, and bucket information. The control modules may be referred to as a logical layer, holds the metadata for the logical layer, and implements the volume/snapshot operations. The data module manages the SSDs and implements one or more RAID algorithms as described further herein.

In some examples, the system 100 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/erase cycle limitations of the various memory technologies.

Figure 1B:
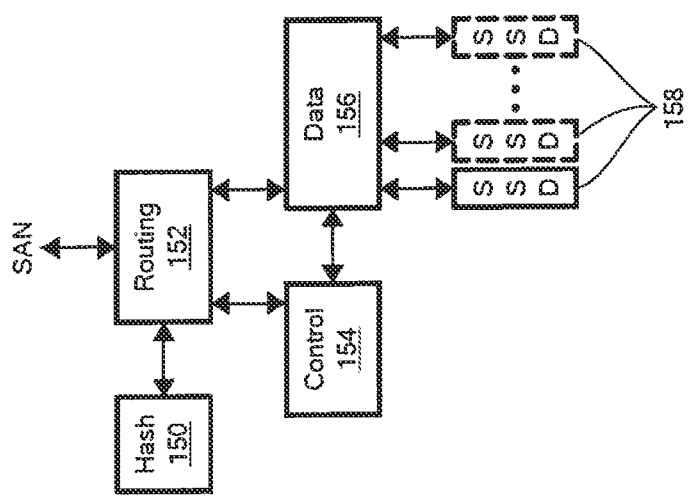
FIG. 1B illustrates further detail of the system of FIG. 1A.

FIG. 1B is an example of a system that can include a hash system 150 communicatively coupled to a routing system 152, which can be communicatively coupled to a control system 154 and a data system 156. The data system 156 can be communicatively coupled to any practical number of memory devices 158. The routing system 152 can route read/write commands from a host (not shown) to control and data systems 154, 156 for execution. In embodiments, the data content-based mapping to physical storage 158 can distribute workload relatively evenly and provide separation of the control and data paths. Read and write operations to the SSDs 158 can be used to generate priority values for the data blocks, as described more fully below.

Figure 2:
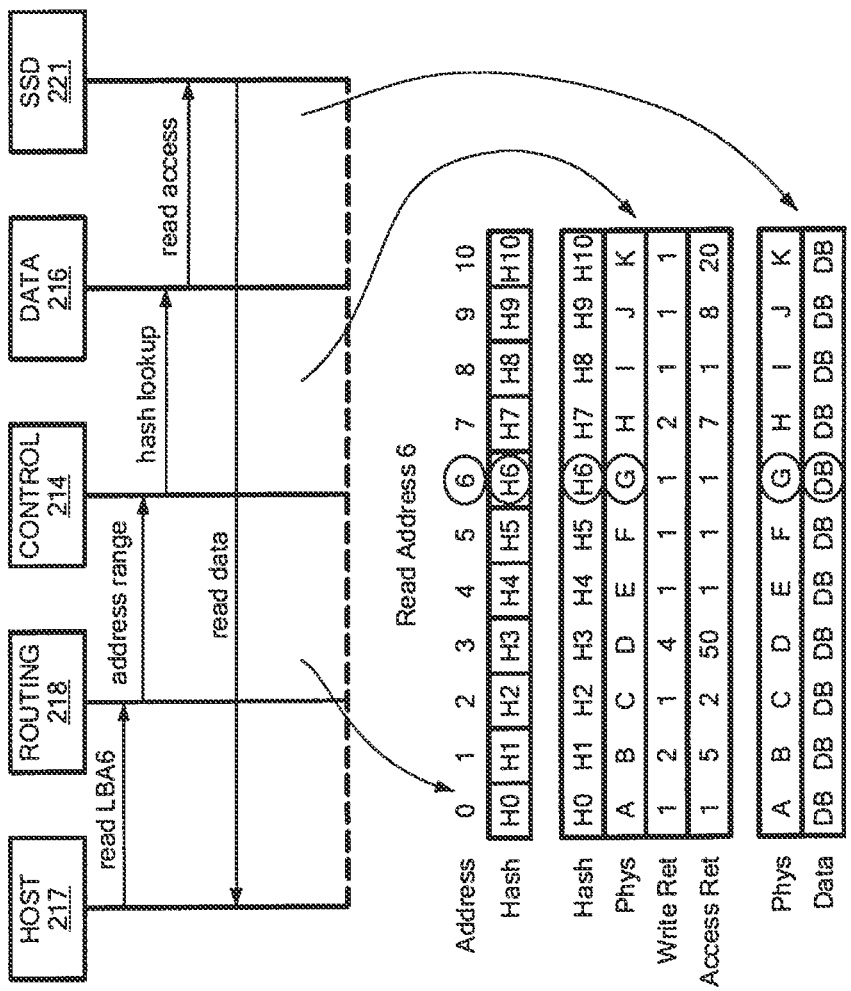
FIG. 2 is a flow diagram of read and write operations for the system of FIG. 1A.

FIG. 2 shows an example IO operation. A host 217 may issue a read command for a logical block address, which is shown as address "6," via a Fibre Channel or iSCSI port, for example. The routing system 218 may receive the read command and determine a requested address range in data blocks of 4K, for example, and pass the address information to the control system 214. The control system 214 may look up address 6 to obtain the hash value, which is shown as H6. This may be referred to as address-to-hash (A2H) lookup. The H6 hash value may be passed to the data system 216 which can perform a look up of the H6 hash value in a hash-to-physical address (H2P) table to read the physical address for the data. In the example, the physical address is shown as "G." The data system 216 can use the physical address to read the data block (DB) at physical address G in the SSD 221. A reference count can correspond to a number of times the hash value is referenced in physical storage. In embodiments, write reference information can be modified for each unique and/or deduplicated write and access reference information can be modified for each read and/or write access.

For a write operation from a host, the routing system 218 can receive the write data and can segment the data stream into data blocks and generate hash values for the data blocks. The hash value can be provided to the control system 214 to determine if the write data is unique. If unique, the hash value can be placed in an address mapping. The control system 214 can pass the hash value to the data system 216, which can assign the hash value to a physical address and write the data block(s) to the SSD at the physical address. In embodiments, the write reference information and/or the access reference information, can be modified, e.g., incremented, If the hash value generated by the routing system 218 is not unique, the control system 214 can determine that data already exists at the physical address for the hash value. Since the data already exists, the data system 216 can increment the write reference information for the data block. In embodiments, the access reference information can also be modified. The data may not be written to the SSD. Deduplication may refer to a write operation where a hash for a data block is found not be unique and the non-unique data block is not written to physical storage. The reference count for the non-unique hash may be incremented.

Figure 3:
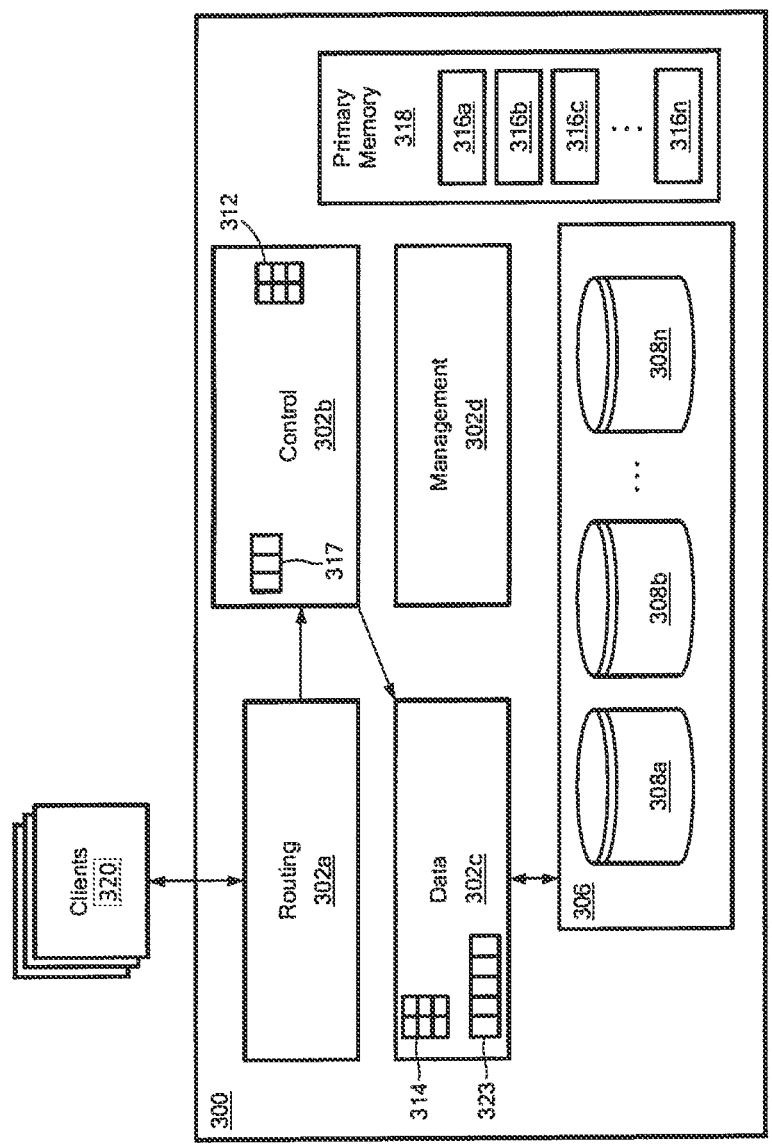
FIG. 3 is a block diagram of a content-based storage system having a control module with a first cache and a data module with a second cache.

FIG. 3 shows a storage system 300 according to an illustrative embodiment of the disclosure. The storage system 300 may be the same as or similar to a node within the distributed storage system of FIG. 1A. The storage system 300 may include a plurality of modules 302a-302d (generally denoted 302 herein), a storage array 306 comprising a plurality of storage devices 308a . . . 308n (generally denoted 308 herein), and a primary memory 318. In some embodiments, the storage devices 308 may be provided as solid-state devices (SSDs).

As described further herein, the storage system 300 also can include a C (also called logical) cache 317 and a D (also called physical) cache 323. The C cache 317 and/or the D cache 323 can, in certain embodiments, be physical devices configured to store certain data so that future requests for that data can be served faster. Although the C cache 317 and D cache 323 are shown as being part of the storage system, it is understood that the C cache 317 and/or D cache 323 can be located anywhere such that they are accessible quickly to the storage system. Data that is stored within a cache might include data values that have been computed earlier or duplicates of original values that are stored elsewhere. If the requested data is contained in the cache (herein referred to as a cache hit), this request can be served by simply reading the cache, which is comparatively faster than going to other types of memory. On the other hand, if the requested data is not contained in the cache (herein referred to as a cache miss), the data may have to be to be recomputed or fetched from its original storage location, which is comparatively slower. Hence, the greater the number of requests that can be served from the cache, the faster the overall system performance becomes.

The primary memory 318 can be any type of memory having access times that are faster compared to the storage devices 308. In some embodiments, primary memory 318 may be provided as dynamic random-access memory (DRAM). In certain embodiments, primary memory 318 may be provided as synchronous DRAM (SDRAM). In one embodiment, primary memory 318 may be provided as double data rate SDRAM (DDR SDRAM), such as DDR3 SDRAM.

As described above, the control subsystem 302b may be configured to maintain a mapping between I/O addresses associated with data and the corresponding chunk hashes. As shown in FIG. 3, this mapping may be maintained using a data structure 312, referred to herein as an "I/O address to chunk hash mapping table" or "A2H table," (also known as A→H table) according to some embodiments. In one embodiment, I/O addresses may be logical addresses used by clients 320 to access data within the storage system 300.

As also described above, the data subsystem 302c may be configured to maintain a mapping between chunk hashes and physical storage addresses (i.e., storage locations within the storage array 306 and/or within individual storage devices 308). This mapping may be maintained using a data structure 314, referred to herein as a "hash to physical address mapping table" or "H→P table," or "H→P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout. In certain embodiments, the H2P table is maintained to route data with different hashes to different D modules. The data subsystem 302c may be also be configured to read and write data from/to the storage array 306 (and/or to individual storage devices 308 therein).

As described above, in a content addressable storage system, data is stored in blocks, for example 16 KB, 8 KB, 4 KB, etc., where each block has a universally unique large hash signature, for example of 20 bytes, which can be saved to disk, e.g., Flash memory. As described herein, hash signatures may be accessed by small in-memory handles (referred to herein as short hash handles, hash handles, or short hashes), for example of 6 bytes. These short hashes may be unique to each volume/array, but not necessarily unique across volumes/arrays. Additional information relating to hash-based replication, computation of hashes, generation and use of short hash handles can be found in U.S. Pat. No. 9,378,106 ("Hash Based Replication"); U.S. Pat. No. 9,208,162 ("Generating a Short Hash Handle") and U.S. Pat. No. 9,396,243 ("Hash-Based Replication Using Short Hash Handle and Identity Bit"), each of which is hereby incorporated by reference.

In embodiments, address to hash mapping (A2H) maps an address inside a volume to the short hash value of its data. In embodiments, meta data can include for each address the hash value of the content. If the basis for deduplication is 16 KB, then the meta data holds for each address the short hash value of the data to which the address points. In cases where access to the volume is in larger chunks than the size of the basic hash value, the meta data for the address space can be readily cached.

As also noted above, hash to physical disk locations can include for each hash key (e.g., 6 bytes) the location on the disk, and the reference count. Where a storage system uses hash keys of 6 bytes, there may be collisions of data generating the same hash. If there is a collision, a new hash key from a different hash address space is generated for the data when the data is written. This means that the hash to physical disk location table may search for a hash value every time a new write arrives. If the write has the same hash value, there is a need to check the long hash value, and verify if there is a hash collision, or whether it is actually the same data. This means that during every write if the hash to physical disk location table is not in the system memory, there may a need to fetch the meta data of the hash from the disk to verify if such a hash exists. It will be appreciated that meta data structures may consume most of system memory, e.g., DRAM, in the storage system, so that the meta data limits the total size of the storage system.

Figure 4:
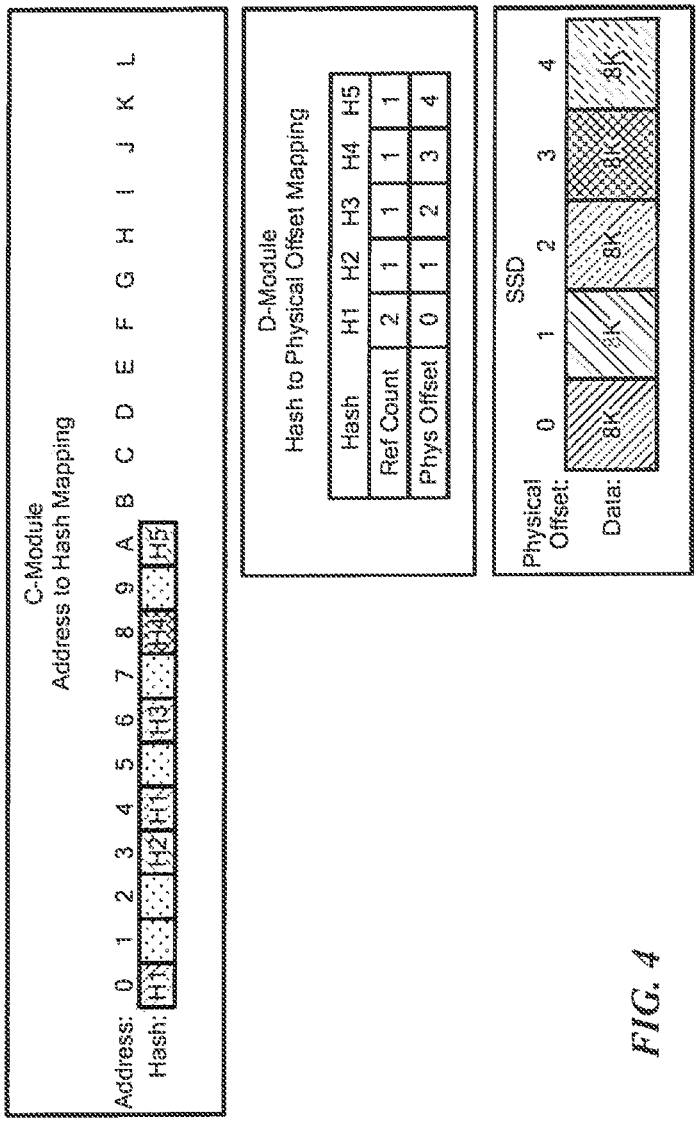
FIG. 4 is a schematic representation of address-to-hash (A2H) mapping in a control module and hash-to-physical (H2P) mapping in a data module for a content-based storage system.
Figure 5:
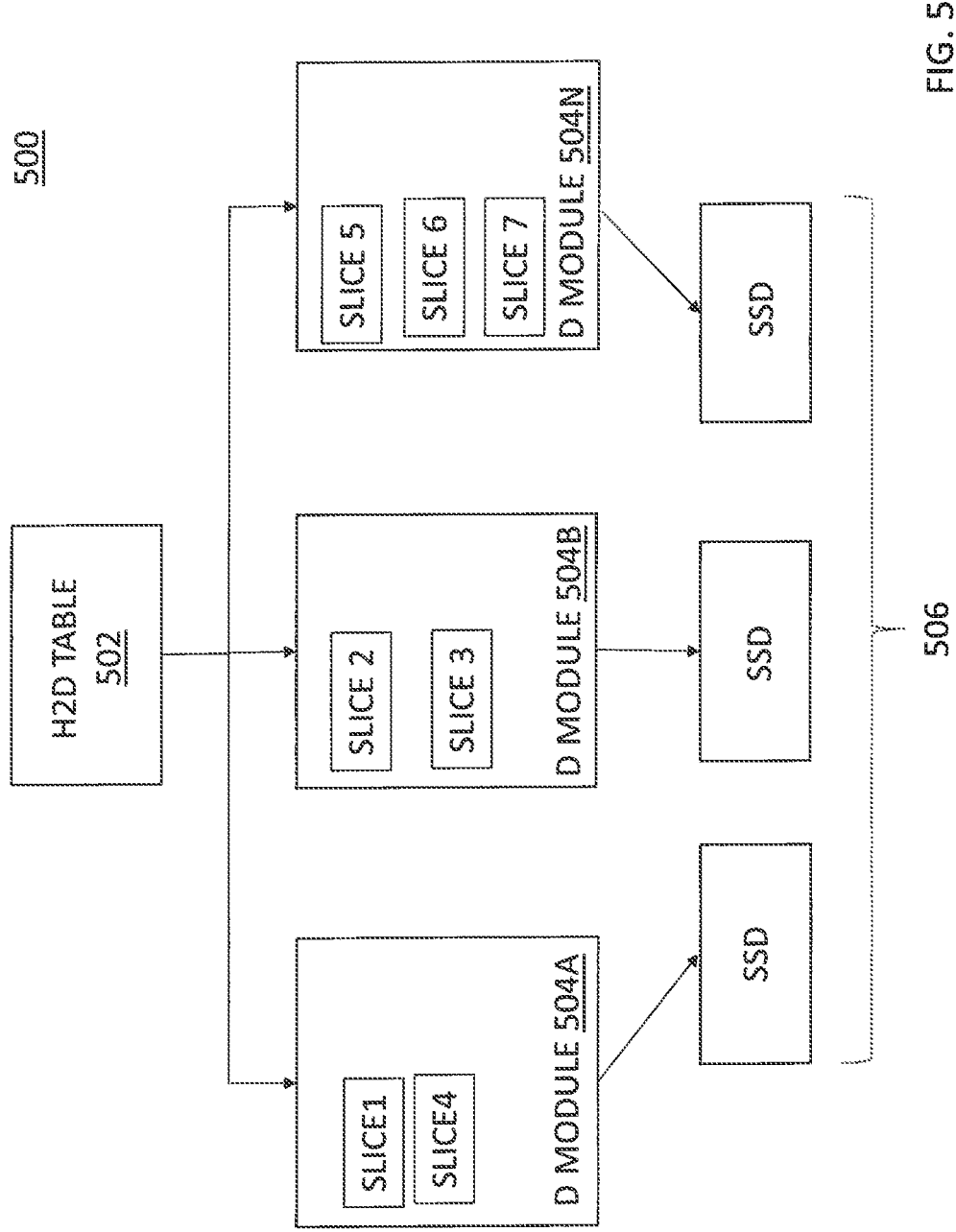
FIG. 5 is a block diagram of a system for enabling dynamic allocation of physical capacity under the responsibility of each D module in an unbalanced CAS system.

FIG. 4 shows an example control or C module address to hash (A2H) mapping 400. As can be seen, as data blocks arrive, the content for the address is hashed to generate H1, H2, H3, H4, H5, as shown. It should be noted that H1 appears twice and is deduplicated. The D-module includes a hash to physical (H2P) mapping showing the physical offset of the data along with a reference count indicative of how many times a given hash value occurs. It will be appreciated that a particular hash value having a high reference count will likely be accessed more often than hash values having a low reference count. In embodiments, a reference count is incremented each time the hash value is generated in a volume. Thus, higher reference count hash values may be preferred for placement in D cache over low reference count hash values. It can be seen that the physical offset corresponds to the order in which a unique hash value is generated. For example, H3 is shown with an offset value of 2 since a second H value was deduplicated.

As described above, XtremIO decides on the physical data placement according to a data signature. In order to write or read an initiator's data at a specific address, a two-level translation is performed. The first level translates the address to a hash signature (a→h table). The next level translates the signature to a physical location on disk (h→d table), also referred to herein as "h2d". The latter translation is done through signifying part of the signature's bits as an h→d slice, or "h2d slice."

The h→d table assigns each slice to a specific data module. Each D module is responsible for storing all of the data falling into h2d slices assigned to that module on SSDs under this module's control. The process of generating data signature is such that data is distributed uniformly among h2d slices. The cluster is declared out of physical capacity at the moment the host IO arrives at the h2d slice assigned to a corresponding D module that has no physical space left. This is true even if other D modules still have free SSD space available.

Scaling an XtremIO cluster up is done by adding more SSD drives to one or more cluster's bricks. The result of this configuration is unbalanced if the physical capacity differs between the bricks.

The embodiments described herein provides dynamic allocation of physical capacity being under responsibility of each D module allowing full utilization of the physical space in an unbalanced CAS system.

In order to utilize unbalanced physical capacity, we take advantage of a fact that each D module is responsible for amount of data proportional to the number of h2d slices assigned to it. Thus, when scale up is performed, we can recalculate amount of h2d slices assigned to each D module and make it proportional to new physical capacity. Since data is expected to be distributed uniformly between h2d slices, that way we will arrive to out of physical space situation approximately simultaneously on all D modules. That will allow us to fully utilize unbalanced physical capacity.

Figure 6:
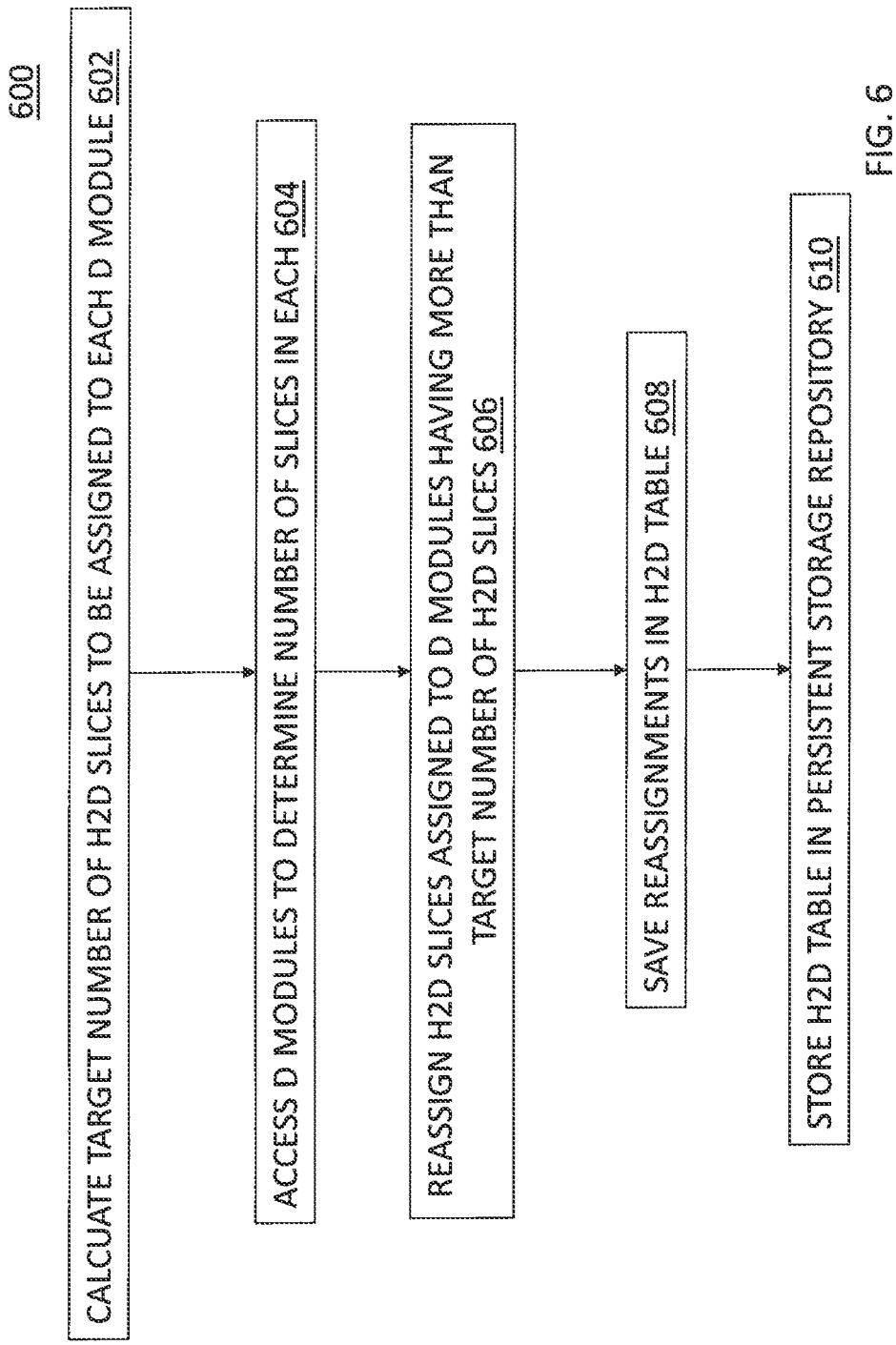
FIG. 6 is a flow diagram of a process for enabling dynamic allocation of physical capacity under the responsibility of each D module in an unbalanced CAS system.

Turning now to FIG. 6, a flow diagram for implementing the embodiments herein will now be described. When scale up is performed, a target amount of h2d slices to be assigned to each D module is calculated dynamically based on resulting (potentially unbalanced) physical capacity to be owned by each D module in block 602. The process 600 of FIG. 6 is performed in the management module without accessing any D modules. The system manager keeps the current h2d table in its persistent storage. When performing the process 600, it accesses and modifies the h2d table from its persistent storage.

The total number of slices is divided between D modules proportionally to resulting physical capacity under responsibility of each D module. For example, suppose the system has 1024 slices. Assume there is a cluster with 4 D modules. Suppose the first two Ds are responsible for a capacity of 40 TB each and the other two Ds own a capacity of 20 TB each. In this example, the total cluster's capacity is 40+40+20+20=120 TB. Each one of the first 2 D modules owns ⅓ of the total capacity and the last 2 D modules each has ⅙ of total capacity.

Now the total amount of slices 1024 are divided proportionally to owned capacity:

1024/3=341

1024/6=170

After the above calculation, the first two D modules have 341 slices each and the next 2 D modules have 170 slices each.

The next step is verifying if there is a remainder:

341+341+170+170=1022.

Thus, 2 h2d slices have yet to be assigned. The remaining 2 slices can be assigned one by one to the first 2 D modules.

According to the above calculations, the first D module will have 342 slices, the second D module will have 342 slices, the third and fourth D modules will each have 170 slices, totaling 1024 slices.

In block 604, access D modules to determine number how many slices each D module possesses. Next, in block 606, h2d slices assigned to D modules currently having more than target number of h2d slices are reassigned one by one to D modules having less h2d slices than required by configuration calculated in block 602. The reassignments are saved in the h2d table in block 608, and the resulting h2d table is then persistently saved into repository in block 610 allowing same algorithm to be also performed during future scale ups.

Figure 7:
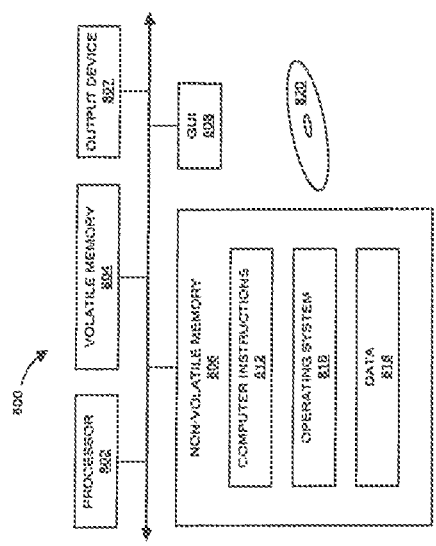
FIG. 7 is a block diagram of an illustrative computer that can perform at least a portion of the processing described herein.

FIG. 7 shows an exemplary computer 800 (e.g., physical or virtual) that can perform at least part of the processing described herein. The computer 800 includes a processor 802, a volatile memory 804, a non-volatile memory 806 (e.g., hard disk or flash), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
    storing a hash-to-physical-location-on-disk (h2d) table in persistent storage of a storage cluster, the h2d table configured to enable routing of data with different hashes to corresponding data modules (D modules) and storing assignments of h2d slices to corresponding D modules, the corresponding D modules configured to read and write data to and from storage devices for corresponding assigned h2d slices, wherein a h2d slice signifies a part of a hash;
    initiating a scale up for the storage cluster, the scale up including adding storage drives to one or more bricks of the storage cluster, wherein the storage cluster is determined to be unbalanced when physical capacity differs between the bricks;
    determining, by a management module of the storage cluster responsive to identifying the storage cluster as unbalanced, a target number of the h2d slices to be assigned to each of the D modules, wherein the target number of h2d slices to be assigned to each D module of the D modules is determined by:
        determining a total number of the h2d slices to assign to the D modules;
        determining a total physical capacity of the storage cluster owned by the D modules; and
        dividing the total number of the h2d slices among the D modules proportionally based on the proportion of the total physical capacity owned by each of the D modules, wherein at least a first proportion owned by a first D module differs from a second proportion owned by a second D module, such that, upon the dividing, each D module of the D modules owns a number of the h2d slices of the total number of h2d slices in a same proportion as a ratio of the total physical capacity owned by each D module, wherein responsive to the dividing, at least one of the D modules owns a different number of the h2d slices;
    identifying a remainder number of the h2d slices resulting from the dividing; and
    reassigning, by the management module in the h2d table and without accessing the D modules, a portion of the h2d slices assigned to one or more of the D modules identified as having greater than the target number of h2d slices to another one or more of the D modules identified as having fewer h2d slices than the target number, wherein the reassigning includes reassigning, one-by-one, the remainder number of h2d slices in sequence to the D modules.

2. The method of claim 1, wherein the h2d table including updated assignments of the h2d slices is retrieved for use by the management module in response to a next scale up.

3. The method of claim 2, wherein the scale up is performed in a content addressable system.

4. The method of claim 1, wherein configuration of the storage cluster is determined to be unbalanced when the D modules are responsible for unequal portions of physical capacity of the storage devices.

5. The method of claim 1, wherein each of the D modules is responsible for an amount of data proportional to the number of assigned h2d slices.

6. A system, comprising:
a memory comprising computer-executable instructions; and
a processor executing the computer-executable instructions, the computer-executable instructions when executed by the processor cause the processor to perform operations comprising:
storing a hash-to-physical-location-on-disk (h2d) table in persistent storage of a storage cluster, the h2d table configured to enable routing of data with different hashes to corresponding data modules (D modules) and storing assignments of h2d slices to corresponding D modules, the corresponding D modules configured to read and write data to and from one or more storage devices for corresponding assigned h2d slices, wherein a h2d slice signifies a part of a hash;
initiating a scale up for the storage cluster, the scale up including adding storage drives to one or more bricks of the storage cluster, wherein the storage cluster is determined to be unbalanced when physical capacity differs between the bricks;
determining, by a management module of the storage cluster responsive to identifying the storage cluster as unbalanced, a target number of the h2d slices to be assigned to each of the D modules, wherein the target number of h2d slices to be assigned to each D module of the D modules is determined by:
determining a total number of the h2d slices to assign to the D modules;
determining a total physical capacity of the storage cluster owned by the D modules; and
dividing the total number of the h2d slices among the D modules proportionally based on the proportion of the total physical capacity owned by each of the D modules, wherein at least a first proportion owned by a first D module differs from a second proportion owned by a second D module, such that, upon the dividing, each D module of the D modules owns a number of the h2d slices of the total number of h2d slices in a same proportion as a ratio of the total physical capacity owned by each D module, wherein responsive to the dividing, at least one of the D modules owns a different number of the h2d slices;
identifying a remainder number of the h2d slices resulting from the dividing; and
reassigning, by the management module in the h2d table and without accessing the D modules, a portion of the h2d slices assigned to one or more of the D modules identified as having greater than the target number of h2d slices to another one or more of the D modules identified as having fewer h2d slices than the target number, wherein the reassigning includes reassigning, one-by-one, the remainder number of h2d slices in sequence to the D modules.

7. The system of claim 6, wherein the h2d table including updated assignments of the h2d slices is retrieved for use by the management module in response to a next scale up.

8. The system of claim 7, wherein the scale up is performed in a content addressable system.

9. The system of claim 6, wherein configuration of the storage cluster is determined to be unbalanced when the D modules are responsible for unequal portions of physical capacity of the storage devices.

10. The system of claim 6, wherein each of the D modules is responsible for an amount of data proportional to the number of assigned h2d slices.

11. A computer program product embodied on a non-transitory computer readable medium, the computer program product including instructions that, when executed by a computer causes the computer to perform operations comprising:
storing a hash-to-physical-location-on-disk (h2d) table in persistent storage of a storage cluster, the h2d table configured to enable routing of data with different hashes to corresponding data modules (D modules) and storing assignments of h2d slices to corresponding D modules, the corresponding D modules configured to read and write data to and from one or more storage devices for corresponding assigned h2d slices, wherein a h2d slice signifies a part of a hash;
initiating a scale up for the storage cluster, the scale up including adding storage drives to one or more bricks of the storage cluster, wherein the storage cluster is determined to be unbalanced when physical capacity differs between the bricks;
determining, by a management module of the storage cluster responsive to identifying the storage cluster as unbalanced, a target number of the h2d slices to be assigned to each of the D modules, wherein the target number of h2d slices to be assigned to each D module of the D modules is determined by:
determining a total number of the h2d slices to assign to the D modules;
determining a total physical capacity of the storage cluster owned by the D modules; and
dividing the total number of the h2d slices among the D modules proportionally based on the proportion of the total physical capacity owned by each of the D modules, wherein at least a first proportion owned by a first D module differs from a second proportion owned by a second D module, such that, upon the dividing, each D module of the D modules owns a number of the h2d slices of the total number of h2d slices in a same proportion as a ratio of the total physical capacity owned by each D module, wherein responsive to the dividing, at least one of the D modules owns a different number of the h2d slices;
identifying a remainder number of the h2d slices resulting from the dividing; and
reassigning, by the management module in the h2d table and without accessing the D modules, a portion of the h2d slices assigned to one or more of the D modules identified as having greater than the target number of h2d slices to another one or more of the D modules identified as having fewer h2d slices than the target number, wherein the reassigning includes reassigning, one-by-one, the remainder number of h2d slices in sequence to the D modules.

12. The computer program product of claim 11, wherein the h2d table including updated assignments of the h2d slices is retrieved for use by the management module in response to a next scale up.

13. The computer program product of claim 11, wherein the scale up is performed in a content addressable system.

14. The computer program product of claim 11, configuration of the storage cluster is determined to be unbalanced when the D modules are responsible for unequal portions of physical capacity of the storage devices.

15. The computer program product of claim 11, wherein each of the D modules is responsible for an amount of data proportional to the number of assigned h2d slices.

* * * * *